(12) United States Patent
Kline et al.

(10) Patent No.: US 6,241,156 B1
(45) Date of Patent: Jun. 5, 2001

(54) PROCESS AND APPARATUS FOR INDIVIDUAL ADJUSTMENT OF AN OPERATING PARAMETER OF A PLURALITY OF ENVIRONMENTAL CONTROL DEVICES THROUGH A GLOBAL COMPUTER NETWORK

(75) Inventors: James R. Kline, Moraga; Matthew L. Costick, Pleasanton, both of CA (US)

(73) Assignee: Acutherm L.P., Hayward, CA (US)

( * ) Notice: Subject to any disclaimer, the term of this patent is extended or adjusted under 35 U.S.C. 154(b) by 0 days.

(21) Appl. No.: 09/642,060

(22) Filed: Aug. 18, 2000

Related U.S. Application Data

(63) Continuation-in-part of application No. 09/495,684, filed on Feb. 1, 2000, which is a continuation-in-part of application No. 09/311,379, filed on May 13, 1999.

(51) Int. Cl.⁷ .............................. G01M 1/38; G05B 13/00
(52) U.S. Cl. ........................ 236/49.3; 236/51; 165/212; 700/277
(58) Field of Search ................... 236/51, 49.3; 700/276, 700/277; 165/217, 212

(56) References Cited

U.S. PATENT DOCUMENTS

| | | | |
|---|---|---|---|
| Re. 30,953 | 6/1982 | Vance et al. ................. | 236/49.3 X |
| 4,491,270 | 1/1985 | Brand .......................... | 236/1 C |
| 4,509,678 | 4/1985 | Noll ............................. | 236/49.3 |
| 4,515,069 | 5/1985 | Kline et al. .................. | 236/48 RA |
| 4,523,713 | 6/1985 | Kline et al. .................. | 236/1 C |
| 4,537,347 | 8/1985 | Noll et al. ................... | 236/49.3 |
| 4,821,955 | 4/1989 | Kline et al. .................. | 236/49.3 |
| 4,860,950 | 8/1989 | Reeser et al. ............... | 236/51 |
| 4,890,666 | 1/1990 | Clark ........................... | 236/49.3 X |
| 4,969,508 | 11/1990 | Tate et al. .................. | 236/51 X |
| 5,103,391 | * 4/1992 | Barrett ......................... | 236/46 R |
| 5,927,398 | 7/1999 | Maciulewicz ................ | 165/209 |
| 6,157,943 | * 12/2000 | Meyer ......................... | 709/200 |

* cited by examiner

Primary Examiner—William Wayner
(74) Attorney, Agent, or Firm—Flehr Hohbach Test Albritton & Herbert (57) ABSTRACT

An apparatus and process for individual adjustment of an operating parameter of a plurality of environmental control devices, such as VAV devices (27, 29) in an HVAC system. The process includes the step of connecting at least one of computers (34) for input of a parameter control set point based signal and a unique VA device identifying signal through an Internet website (71) to the plurality of HVAC devices (27, 29). The computer (34) is, for example, connected to the VAV devices (27, 29) such that the computer (34) can be used to adjust the temperature set point of only one of the plurality of VAV devices (27, 29), most typically the device located in the same space (22) as the communicating computer (34). Such computer (34) can be wired or wireless, and use the global computer network website (71) to connect to the VAV devices (27, 29) through a building computer (24) and local area network (32). In the preferred form, the computers (34) are also capable of retrieving the current temperature set point from the VAV device (27, 29) and the current room air temperature proximate the VAV device (27, 29), outputting or displaying them on a computer output or display device, and thereafter adjusting the temperature set point for the environmental control device, for example, by using graphical interface software.

20 Claims, 4 Drawing Sheets

PROCESS AND APPARATUS FOR INDIVIDUAL ADJUSTMENT OF AN OPERATING PARAMETER OF A PLURALITY OF ENVIRONMENTAL CONTROL DEVICES THROUGH A GLOBAL COMPUTER NETWORK

RELATED APPLICATION

This is a continuation-in-part of pending application Ser. No. 09/495,684 filed on Feb. 1, 2000, which is a continuation-in-part of pending application Ser. No. 09/311,379, filed May 13, 1999.

This is a continuation-in-part application of our prior application, Ser. No. 09/495,684, filed Feb. 1, 2000, entitled "Process and Apparatus for Individual Adjustment of the Set Points of a Plurality of VAV Devices Through a Network Server" now pending, which was a continuation-in-part of our prior application, Ser. No. 09/311,379, filed May 13, 1999, entitled "Process and Apparatus for Individual Adjustment of the Temperature Set Points of a Plurality of VAV Devices, now pending.

TECHNICAL FIELD

The present invention relates, in general, the operation of environmental control devices, such as, heating, ventilating and air conditioning (HVAC) systems, lighting, humidifying and noise control systems and more particularly, relates to HVAC systems having variable-air-volume (VAV) diffusers or VAV boxes with adjustable temperature set point controllers.

BACKGROUND ART

The use of variable air volume (VAV) devices in order to control the temperature and/or ventilation in large buildings is wide spread. Such HVAC systems typically have at least one, and sometimes a plurality of VAV devices located in the various spaces, rooms or offices within the building for control of the discharge of conditioned air into the offices. The air will be provided by a central source, and the volume air discharged into each office within the building will be varied in accordance with the control mechanism for the VAV device. Such VAV devices typically have a damper or set of blades, which is moved by an actuator so as to change the area of the opening from which conditioned air is discharged from the VAV device. VAV boxes most often are positioned upstream of a plurality of passive (damperless) air diffusers, while VAV diffusers include actuators and dampers at the structure discharging air into the space or office.

The control assembly for a VAV device will have one or more temperature set points which are used as a basis for regulating opening and closing of the damper by the actuator so as to drive the room temperature toward the set point. One set point may be used, for example, when the system is in a heating mode, while another may be used for a cooling mode. In some systems, however, the same temperature set point is used for heating and cooling.

In large office buildings, the HVAC system will be coupled to a plurality of thermostats located in the various offices or to a central building HVAC computer for monitoring and adjusting the set points for the VAV devices. In multiple thermostat systems, wiring must be run between individual VAV devices and the thermostats. In central computer systems, the computer is coupled through an HVAC building computer network that is coupled to the VAV devices. The central building control computer, therefore, can be used to monitor and adjust the set point temperatures of the various actuators in the VAV devices for individual offices.

One of the major disadvantages of thermostat-based systems is the wiring required during installation, which can be tricky in open office environments having free-standing work stations and space-dividing partition systems. A major disadvantage of building-wide HVAC computer monitoring systems is that the temperature set point adjustments must be made from a central monitoring station. Thus, the occupants of the individual offices in the building are not able to provide direct input as to the desired temperature set point for the VAV device effecting their office. Instead, occupants typically communicate with the building central monitoring and adjustment computer by telephone so as to make their wishes known with respect to environmental demands in their office. Often temperature set point changes are made by the occupants of offices without knowing what the room air temperature in their office actually is at the time of the set point change. This can lead to unneeded changes.

In newer office buildings the central monitoring station can also be coupled and configured to control the operation of other environmental control devices, such as, humidifiers, lighting and "white" noise or noise cancellation devices. Again, communications between individual offices and the central monitoring/controlling computer make use of such systems less than optimal.

It would be highly desirable, therefore, to have an environmental control system suitable for large buildings in which the individual environmental control devices are capable of having their operating parameters set independently directly by occupants of the offices. Moreover, the changes most preferably would be made by an occupant having knowledge as to the current conditions of his or her office and would be made through a method other than using telephone communications or wall-mounted thermostats, in the case of HVAC systems. Thus, the occupants, who know best what environmental conditions are most suited for their office at any given time, and knows what the current conditions are, would like to have a way of adjusting the environmental control devices in their space without having to communicate with a central monitoring operator, and without having to go to a wall-mounted controller, such as a thermostat.

Accordingly, it is an object of the present invention to provide a process and apparatus for individual adjustment of the operating parameters of an environmental control device located in an occupant's office without affecting other offices and without using a wall-mounted controller or having to communicate by telephone to a person at a central computer.

It is a further object of the present invention to provide a means for the occupant of a space in the building to easily determine the current room air temperature and to adjust the temperature set points of a VAV device discharging air into his or her space using computer equipment commonly available, such as personal computers, cell telephones and a global computer network (the Internet).

It is still a further object of the present invention to provide a VAV device adjustment system which is easy to install, is user-friendly, is relatively low in cost and provides a wide range of user flexibility.

The process and apparatus of the present invention have other objects and features of advantage which will become more apparent from, and are set forth in more detail in, the following Description of the Best Mode of Carrying Out the Invention and the accompanying drawings.

DISCLOSURE OF THE INVENTION

A process for individual adjustment of an operating parameter of a plurality of environmental control devices for a building is provided, which is comprised, briefly, of providing at least one computer formed to produce an operating parameter set point based signal which is communicated through a global computer network to a selected environmental control device for a space in the building. The computer can be an office personal computer, laptop computer or Internet appliances, such as, hand-held wireless communication devices or personal digital assistants (PDA's) and wireless telephones meeting wireless application protocols (WAP), among other possible computers. The operating parameter is preferably the temperature set point of a VAV device located in the user's office, and the user can log-on to an Internet website, which is coupled to, or can be coupled to, a central building computer. A temperature set point based signal from the user's computer can be communicated through the Internet to the building computer to control the user's own VAV device. Each VAV device is responsive to the temperature set point based signal to adjust the temperature set point for the VAV device in the space of the selected computer. The method includes further the steps of communicating a temperature set point based signal from the selected computer to the VAV device by using encoded signals to effect adjustment of the temperature set point independently of other VAV devices in the building's HVAC system. Most preferably current environmental conditions in the space, such as the room air temperature, are also communicated to the occupant so that set point adjustments can be made with knowledge of the current room conditions.

The environmental parameter control system of the present invention comprises, briefly, a plurality of environmental control devices each adapted for receipt of a signal to adjust a parameter for operation of the device, at least one computer each adapted to produce signals suitable for adjusting the operating parameter, and a global computer network website suitable for communication of signals between the computer and environmental control devices so as to adjust the operating parameter of a selected one of the environmental control devices.

In the most preferred form, a wireless telephone, desktop, laptop or other multipurpose computer of the type commonly employed in business, government and educational applications is coupled through an Internet website to a central building computer. HVAC systems can be controlled by transmitting encoded temperature set point based signals and room temperature signals so as to enable determination of the current room temperature and current temperature set point, and to enable adjustment of the VAV device temperature set point in the office or space.

BEST MODE OF CARRYING OUT THE INVENTION

In recent years the multipurpose business or personal computer has become omnipresent in modern office buildings. Such computers may take the form of desktop, laptop or even hand-held computers. Even more recently, a host of devices capable of communicating with the Internet, and various computer networks, through modems or through download/upload ports, have been developed such as, PALM-based hand-held computers, wireless or cellular telephones and personal digital assistants (PDA's), herein collectively referred to as "Internet appliances." In accordance with the present invention, such computers, which include Internet appliances, may be adapted for use to individually adjust an operating parameter of an environmental control device, such as the temperature set point of a VAV devices in an HVAC system. Thus, a personal computer or Internet appliance can be used, in the apparatus and method of the present invention, to monitor the current room temperature and the current temperature set point and to adjust the temperature set point(s) of the VAV device as desired.

Figure 1:
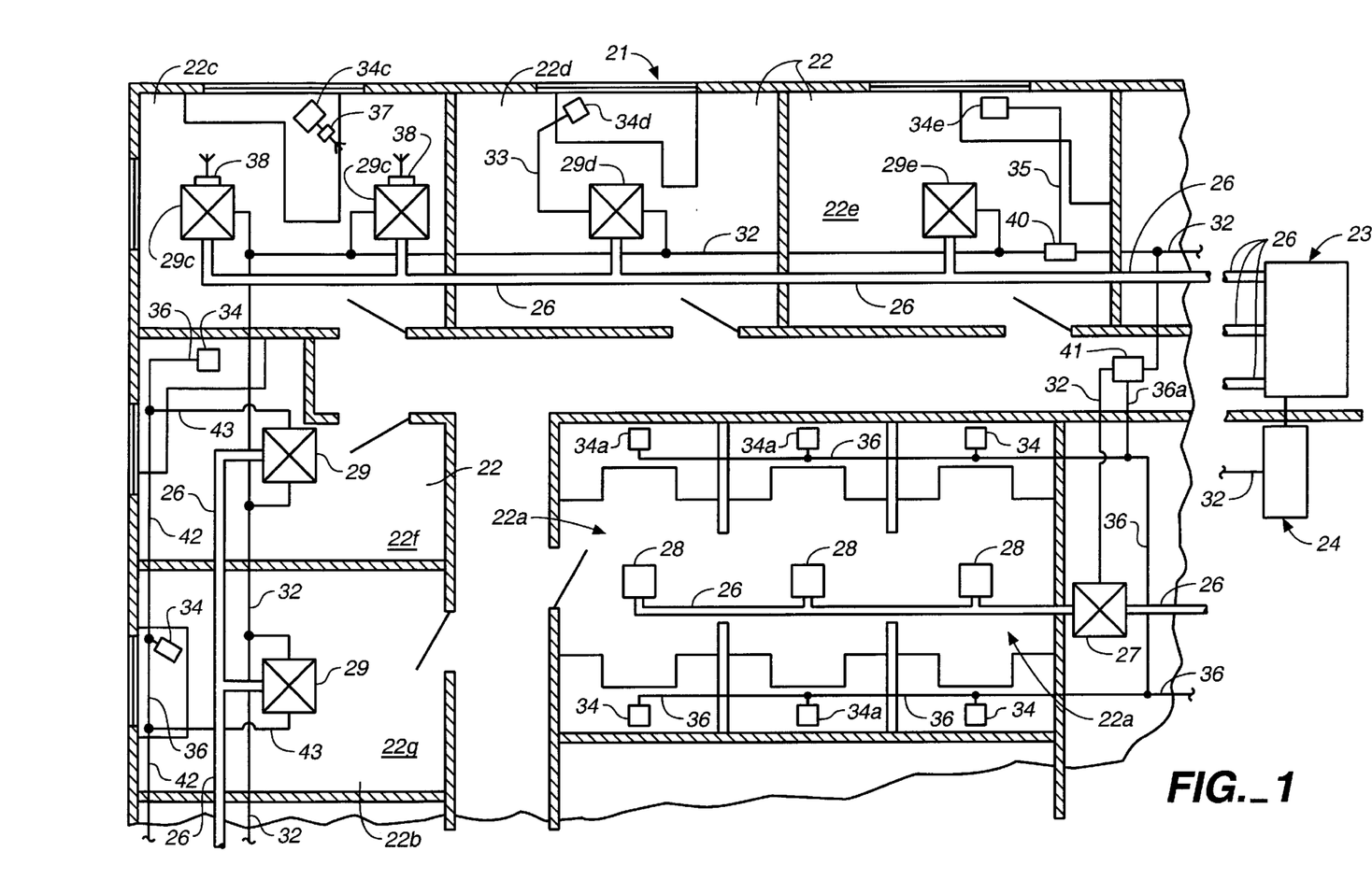
FIG. 1 is a fragmentary, schematic, top plan view of a typical building floor plan having an HVAC system with a plurality of VAV devices monitored and adjusted in accordance with an embodiment of the present invention not implemented using the Internet.

Referring now to FIG. 1, a first embodiment of a typical HVAC system installation for an office building is schematically illustrated. Building 21 has a plurality of offices, rooms or spaces 22 that are air conditioned using a plurality of VAV devices supplied with conditioned air from a central source 23. The operation of the VAV devices can be monitored and adjusted by a central or building computer at monitoring station 24. Ducts 26 for the flow of supply air from a central air conditioning source 23 to the VAV devices are provided. Alternatively, building 21 could be provided initially with a plurality of wall-mounted thermostats (not shown) which are wired to the various VAV devices so as to control the flow of supply air from source 23 being discharged into offices 22.

VAV devices usually take one of two forms, namely, an air diffuser which has an actuator and movable damper assembly in it (graphically symbolized in the drawing by a square with diagonal crossed lines), or a VAV box (also a square with a cross) upstream of passive or damperless air diffusers (squares only) which discharge supply air into spaces 22. A large office or space 22a, for example, can include a VAV box 27 employed to vary air flow to a plurality of passive air diffusers 28. In smaller spaces, such as space 22b, VAV air diffusers 29 having movable dampers will more typically be employed.

Although VAV devices 27 and 29 are not always linked together for monitoring by central computer 24 (e.g., when a thermostat system is used), in the illustrated HVAC system, central computer 24 is attached to an HVAC building system computer network 32, which in turn, is coupled to each of the VAV devices 27 and 29. Each of the VAV devices 27 and 29 includes a control assembly in which there is an actuator and interface so that encoded temperature set point based signals received from central computer 24 through network 32 can be used to adjust the set point(s) temperatures about which a given VAV device operates. The VAV devices may be thermally powered, pneumatically powered or electrically powered, and typically each VAV device will have one or more temperature set points governing its operation. One temperature set point, for example, might be used when the central source of conditioned air 23 is in a heating mode, while another temperature set point at each VAV device might be employed when source 23 is in a cooling mode.

Such HVAC systems using VAV devices are well-known in the art, and they allow central computer 24 to monitor the current temperature set points of each of the VAV devices and the current room air temperature in each space or office, as well as to send unique or individual identifying encoded signals along the HVAC computer network 32 to the VAV devices so as to adjust or change the temperature set points, and thus operation of the system, on a space-by-space basis.

The primary drawback of such central computer systems has been that occupants in any one of offices or spaces 22 either have little ability to adjust the operation of the VAV devices in their office, or they must do so through cumbersome techniques, such as telephoning an operator or computer at the central computer 24. In thermostat-based systems, the occupant must get up from his or her desk and go to the wall thermostat, and such thermostat-based systems also have initial installation disadvantages in terms of wiring costs, and many prior art systems give the user little or no information as to the current room air temperature.

The present invention utilizes the fact that computer hardware and Internet communications are both in widespread use in office buildings of the type which are air conditioned using VAV devices. Thus, as shown in FIG. 1, offices 22 will usually have one or more personal computers 34 located in them. In some offices, such as office 22c, computer 34 will be a stand-alone computer, while in others, for example office 22a, computers 34 will be coupled together by a local area network 36. In conventional configurations neither the stand-alone computers, nor those coupled together through a local area network, will interact or be coupled in any manner to building HVAC computer network 32, nor to any of the VAV devices. Building computer network 32, therefore, normally is operated totally independently of computers 34 in use by the building occupants.

In the process and apparatus of the present invention, however, a computer 34 is connected for input of temperature set point based signals directly (in the embodiment of FIG. 1), or indirectly through the Internet (in the embodiment of FIG. 3), to at least one VAV device. In the FIG. 1 embodiment computer 34 and VAV device 27, 29 are located in the same office or space 23. Thus, computer 34d in space 22d is coupled for the direct input of temperature set point based signals to VAV device 29d, and computer 34e is coupled to directly input signals to VAV device 29e in space 22e.

As can be seen for space 22a, VAV box 27 is typically located outside space 22a, but computers 34a in space 22a are coupled to VAV box 27 to enable monitoring and adjustment of the set point temperatures for VAV device 27 so as to vary the discharge of air from passive diffusers 28 in space 22a. As used herein, therefore, computers are connected or coupled to the VAV device "located for the discharge of air" into the same space or office as the computer, even though the VAV device, an upstream control box 27, may be located in a space outside that in which the computer is located.

The direct coupling of computers 34 in spaces 22 to their respective VAV devices 27, 29 can be accomplished in several different manners. A wireless approach is illustrated in office 22c in which a transmitter, or preferably transceiver, graphically shown at 37, at computer 34c communicates with receivers, or preferably transceivers, 38 at one or more VAV devices. In office 22c, two VAV devices 29c are provided with transceivers 38 which can communicate with the transceiver 37 at computer 34c. The same signal when transmitted from computer 34c will be capable of adjusting the set point temperature of each of the VAV devices 29c.

Computer 34c will include a program which causes the transceiver 37 to broadcast signals to the two VAV devices. The VAV devices, in turn, have an interface between transceivers 38 and the controller for the diffuser actuator so that adjustment of the set point for the controller in each of the VAV devices can be accomplished.

Such interface and diffuser controller technology is well-known in the art. The computer 34c, however, normally will not be capable of transmitting a signal which would effect a change in the temperature set point of VAV device 29d. This can be accomplished easily by using encoded transmissions or limiting the power of the transmitter or crippling (limiting) the sensitivity of transceivers 38. Computer 34c or transceiver 37 could be a radio frequency transceiver dedicated to the task, such as a garage door opener transmitter with the capability to receive signals, or it could be a more general purpose device, such as a wireless telephone transmitting through a cell to call transceiver 38.

It will be understood, that optical or other forms of transceivers also could be employed.

An alternative manner of directly coupling computers 34 to VAV devices 27 and 29 would be simply to provide an electrical signal communicating wire, link or cable. Thus, in office 22d, a stand-alone computer 34d is coupled directly to VAV device 29d by a cable 33 for the communication of signals to the controller of VAV device 29d. Still a further approach is shown in connection with the computer 34e in space 22e. Computer 34e is coupled by cable 35 to a router box 40 which, in turn, enables encoded signals to be sent through cable 35 and router 40 and thereafter over building HVAC network 32 to VAV device 29e. When this type of coupling technique is employed, computer 34e should include software, or another adaptation, which causes the output signal from computer 34e to be capable of adjusting only the set point of VAV device 29e. An encoded output signal, for example, would suffice.

Local area computer network 36 for computer 34a also can be coupled by cable 36a to a router 41 inserted in building management HVAC network 32. Encoded signals generated by input at any of computers 34a, therefore, would travel through local area network 36, link 36a, router 41 and building HVAC network 32 to VAV device 27.

Still a further direct connector technique is shown in offices 22f and 22g. Computers 34 are connected to a local area computer network 42, which can then be directly coupled at 43 to diffusers 29. This approach does not require connection to building HVAC network 32, but it does require encoded signals or the like so that the computer in space 29f does not adjust operation of the VAV device in space 22g. It would be possible, of course, to link local area network 42 to building network 32, which usually would be preferred since less wiring would be required than employing a plurality of cable links 43.

In the preferred direct coupling embodiment, all computers 34 would enable communications in both directions so that the occupant in a space 22 can poll the VAV devices 27 and 29 to determine what their current temperature set points are and to determine the current room air temperature in the space. Thereafter computer 34 would send a temperature or parameter set point based signal back to the VAV devices together with a unique VAV identifying signal, which would cause a selected one of the VAV devices to have its temperature set point changed.

Figure 2:
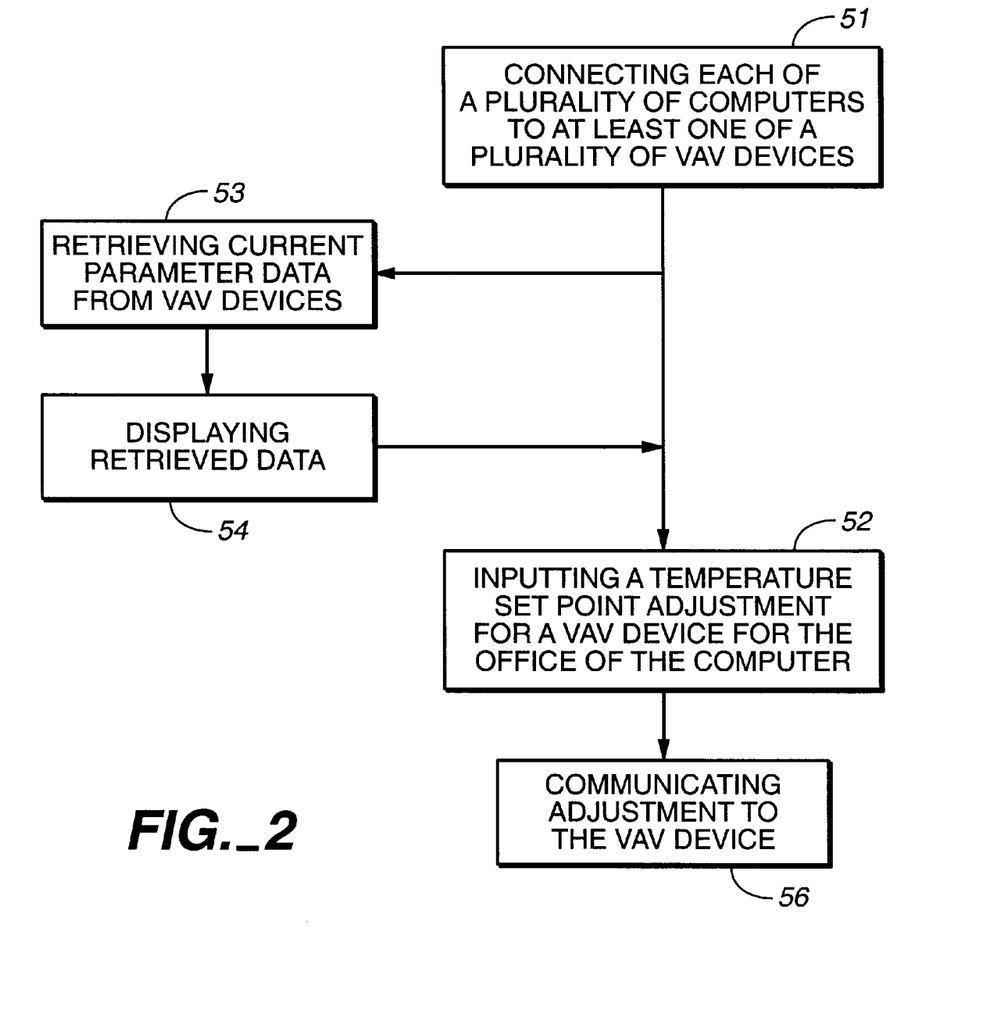
FIG. 2 is a schematic flow diagram of the VAV device temperature set point adjustment process of the embodiment of FIG. 1.

Referring now to FIG. 2, the process for independent adjustment of temperature set points of a plurality of VAV. devices in the HVAC system of FIG. 1 can be described. The first step 51 of the process is to connect or couple each of a plurality of computers to at least one of a plurality of VAV devices. Each computer is formed or adapted to produce signals suitable for adjustment of a temperature set point of a VAV device. Most typically this will be accomplished by providing each computer 34 with a VAV temperature set point adjustment software program that can generate an encoded output signal suitable for transmission directly to the VAV device or communication via a network or a plurality of networks to the VAV device. The encoded signal will include both VAV identifying signal (or data) and temperature set point based signal (or data).

It should be noted that in a given building 21 having a plurality of offices 22, not all of the offices need to have VAV devices which are individually adjusted using individual computers. Thus, a plurality of spaces 22, perhaps less than the entire building, may be individually adjustable by occupant computers, while another set of spaces or offices are not so coupled.

The second step 52 in the present process is to input into a selected computer a temperature set point adjustment input for the VAV device discharging air into the space in which the computer is located. Thus, in a broad form of the process each computer 34 would merely be capable of inputting temperature set points, for example, through a keyboard or through a graphical interface displayed at the computer and manipulated using a mouse. The graphical display, for example, can simply be a thermometer in which the curser driven by the mouse is used to adjust a graphical temperature symbol on a screen to change the temperature set point.

While a broad form of the process merely requires inputting, it is most preferable that individual computers 34 further be adapted to retrieve both the current room air temperature and the current temperature set point data from VAV devices 27 and 29. Thus, an optional step 53, prior to inputting step 52, would be to retrieve the current room air temperature for the user's space and the current temperature set point from the VAV device by polling the controller of the VAV device to determine the room air temperature and its current temperature set point setting. Once this information is retrieved, an additional optional step 54 in the present process would be to display the retrieved current temperature and the temperature set point, either as a numeric display or a graphic display.

Having retrieved the current room air temperature and the current temperature set point setting and displayed them, the present process would then proceed with user inputting step 52, for example, through the keyboard or mouse of computer 34, for adjustment of the temperature set point for the VAV device discharging air into the space having the communicating computer 34. Finally, the software in computer 34 communicates, at step 56, the new temperature set point to the VAV device 27 or 29 in the form of a temperature set point based signal, usually encoded with VAV identifying data, directly to the VAV device through direct links or network links.

While the systems of FIGS. 1 and 2 have been described in connection with an HVAC system, it will be understood to be applicable to other environmental control devices such as humidifiers, lighting systems and white noise generators, to name only a few alternatives. In such systems an operating parameter, such as the humidifier humidity set point, and a current space parameter, such as the current humidity level in the room, would be retrieved and then the set point adjusted by the individual through his computer and one of the above-described communication links, or through the global computer network (Internet) system described below. The current room humidity would allow the user to make a better decision as to the need for and amount of the operating parameter set point adjustment, particularly for a space parameter, such as humidity which is somewhat less intuitive than temperature.

Figure 3:
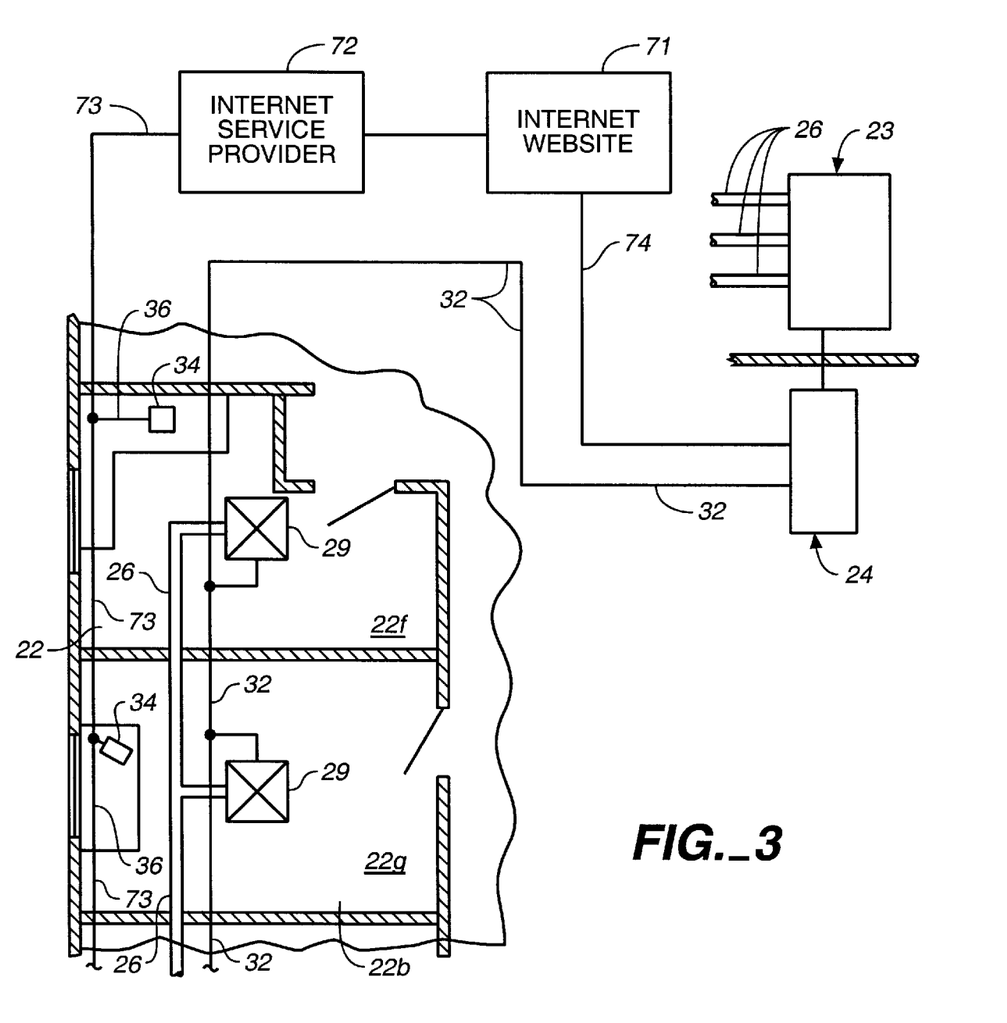
FIG. 3 is a schematic representation of an alternative embodiment of the HVAC system of the present invention showing use of a global computer network to effect temperature set point based signal communication.

In FIG. 3, the process and apparatus of the present invention are implemented using the Internet and a website that is configured to enable control of environmental control devices in building 21. Thus, a website 71 provided through Internet Service Provider 72 is used to communicate operating parameter signals to the user's environmental control device through building computer 24. Temperature set point based signals, for example, can be selectively retrieved from and communicated to the user's VAV device using Internet website 71, as can the current room air temperature of user's space 22.

In FIG. 3, office spaces 22$f$ and 22$g$ are used, as shown in FIG. 1, except that computers 34 are not directly wired to VAV devices 29 nor directly connected to building local area network 32. Instead, computers 34 are shown as being connected through the Internet and Internet Service Provider 72 to a network website 71. As schematically illustrated in FIG. 3, a communications "line 73" is shown, such as a telecommunications line, but as is well known, the "line" 73 also can be a wireless connection to website 71 through an ISP. Thus, as used herein "computer" also shall specifically include Internet appliances, such as cell telephones and hand-held wireless computers with appropriate programming. Website 71, in turn, is formed for connection through a "line" 74 to building computer 24, which connection also can be a wireless connection. Internet website 71 will include its own software, which can be available or connected to building control computer 24, or be formed to be responsive to an input from either an individual computer 34, or from building computer 24 to connect website 71 to building computer 24.

Typically, website 71 will be provided on the Internet by the company installing the environmental control equipment. Building computer 24 can be connected by a DSL line 74 so as always to be accessible for communications to and from website 71, and each of plurality of computers 34 can selectively log in, with an identifying password, to website 71 for communication of signals affecting operation of the environmental control device, e.g., the HVAC, lighting, humidifier, etc.

In the preferred form of the illustrated system, individual computers 34 will log onto Internet website 71 and request the current space parameter, such as room air temperature, and the current operating parameter set point of the environmental control device in a space used by the individual (based upon, for example, the user's password which identifies a selected one of spaces 22). This request will be communicated from website 71 through link 74 to building computer 24, which in turn will poll the VAV, or other device, for the current conditions in the space and the current set point, using local network 32. The current set point will be communicated back to the requesting computer 34 through building computer 24, network 32, link 74, website 71 and link 73. Thus, the computers 34 can access the current space parameters and the current operating parameter set points of the equipment in their space through Internet website 71. In the preferred embodiment, the temperature set point controlling of VAV diffuser operation can be changed, but as described above, other environmental control devices can be similarly controlled.

In the most preferred implementation, the current space parameter (room air temperature) and the current operating parameter set points can be stored in a storage device in building computer 24 periodically, and website 71 can be used to poll the building computer 24 for the stored data for the individual's own space, as determined by input of the user's password. An alternative embodiment would be to store such data at website 71.

For example, each time the operating parameter set point is changed by the building computer, or by any node (user computer 34), the old set point in a database in computer 24 will be replaced by the new set point so that the building computer database always has the current operating parameter set point stored therein in a manner correlated to the individual environmental control devices. Similarly, each environmental control device 29 can be formed to communicate to building computer 24 the current space parameter value, such as the current room air temperature, which also can be stored in a manner correlating the space parameter for each environmental control device in the building. The stored space parameter values can be changed each time the environmental control device senses that the space parameter has changed by a predetermined amount. For VAV devices sensing room air temperature in spaces 22, that amount can be as small as 0.1° F. VAV devices which are capable of transmitting space parameter signals to a building computer upon the occurrence of a 0.1° F. change in room air temperature for storage and later retrieval are described in detail in commonly owned U.S. patent application Ser. No. PCT/US99/29587, which is incorporated herein by reference. These VAV devices employ thermal actuators that are electrically controlled using resistance heaters so as to open and close the diffuser damper blades.

Figure 4:
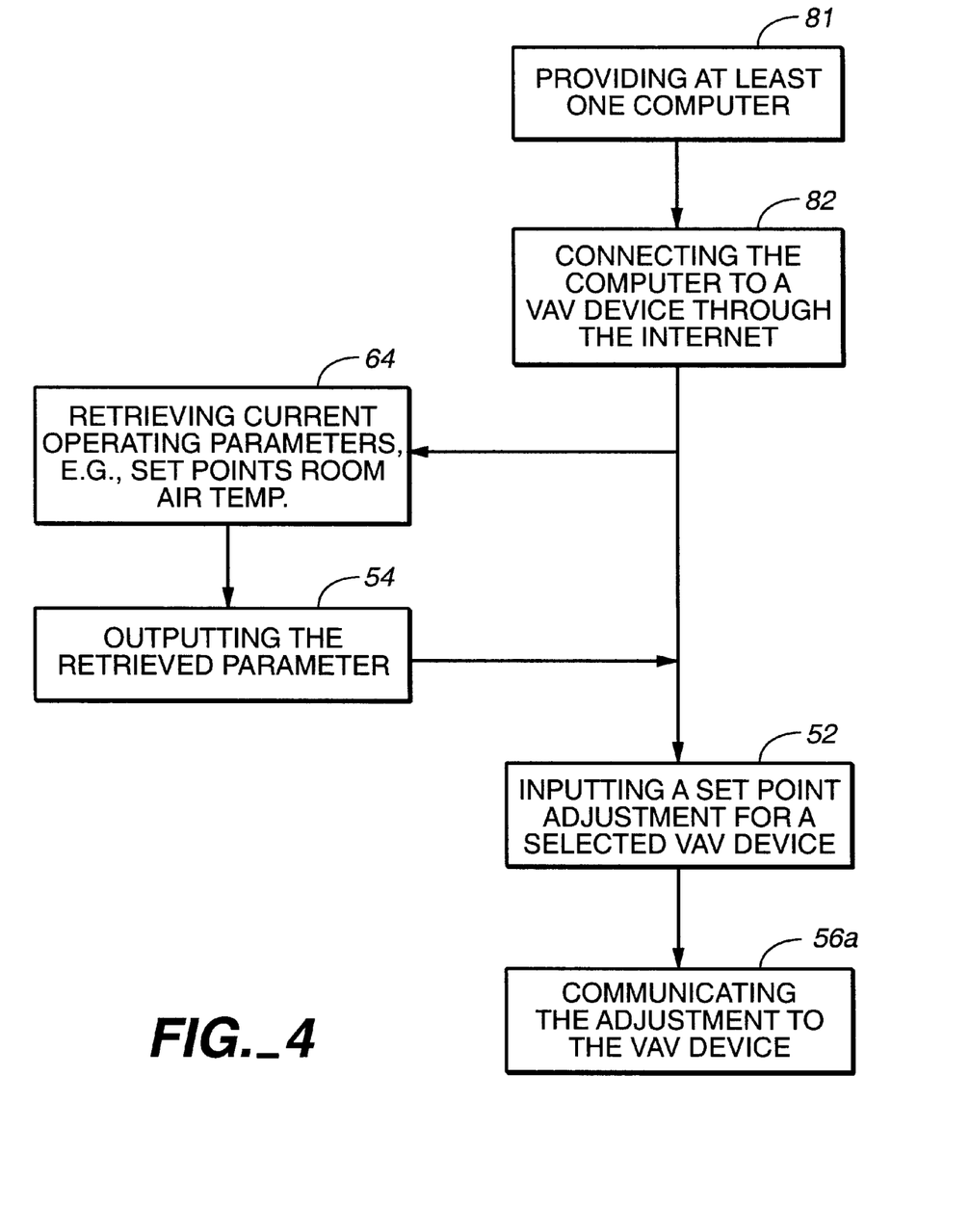
FIG. 4 is a schematic flow diagram of the process of the embodiment of FIG. 3.

Referring now to FIG. 4, the process steps of the system of FIG. 3 can be described. The first step 81 is to provide at least one and preferably a plurality of computers 34 each formed to produce an operating parameter set point based signal for communication to an environmental control device located in one of a plurality of spaces in a building. As a next step, at least one of the plurality of computers is connected at step 82 through a global computer network to the plurality of environmental control devices, such as VAV devices 29. Thus, an individual logs into website 71 which is linked via the Internet to the building computer 24 and polls the storage database in the building computer for the current operating parameter set point of a particular environmental control device, such as the VAV device 29 in the user's space, most typically the same space as the computer. User's computer 34 is thereby connected or coupled to VAV device 29.

Normally the user will also perform a retrieval or determining step 64 in which the current set point and current space parameter are retrieved from the building computer database through the Internet connection. They can, however, simply change the set point of the environmental control device without retrieving current parameter data. Thus, the user inputs a temperature set point, or other operating parameter, adjustment using the computer keyboard, graphical interface, etc., at step 52, which is communicated to VAV device 29 through link 73 to Internet website 71 and thereafter through link 74 to building computer 24 and through network 32 to VAV device 29, at step 56a.

Communicating step 56a is preferably accomplished in the HVAC system of FIG. 3 by sending an encoded signal through Internet website 71 to the building computer and thereafter to the identified environmental control device. The encoded temperature set point based signal and environmental control device identifying signal on network 32 will normally be reacted to by only one environmental control device, for example, the controller for VAV diffuser 29 in office 22f. The temperature set point for this VAV diffuser is thereby determined and changed. It will be understood that a plurality of environmental control devices could be programmed to react to the same unique control device identifying signal.

When current operating conditions are to be retrieved, optional steps 64 and 54 may be performed. Building computer 24 can respond to the user's identifying password to communicate signals back to the user's computer indicating what data is stored in the building computer for the current set point and the current room air temperature for the HVAC device identified by the user's unique password. Thus at step 64 the current parameters are determined, and at step 54 they are output, usually by a visual display.

Thus, wired or wireless computers or Internet communication devices are connected to VAV devices through an Internet network website so that users can monitor and display the temperature set point and current room air temperature for the VAV device which discharges air into their office or space. The occupant of an office is able to make an adjustment of only the VAV device which affects his or her environment, without leaving his or her desk or work station, or when wireless communications are made, even before the user arrives at his or her office. The only requirement is wired or wireless connection of the occupant's computer through the Internet to the VAV device.

The present apparatus and process, therefore, allow the individual occupants of offices to monitor and adjust their environment at their work stations using conventionally available equipment, such as a multipurpose business or personal computer or a cell telephone, Internet connections, and rather simple parameter set point programs.

Finally, while the apparatus and process of the present invention may be implemented using an HVAC system which employs VAV devices having thermal actuators that are electrically controlled, using resistance heaters. Other VAV devices, including pneumatically controlled and motor-driven diffusers and VAV boxes, also are suitable for use in the system of the present invention. Additionally, the present invention also can be implemented using HVAC systems in which the supply air temperature is varied, instead of the supply air volume.

What is claimed is:

1. A process for individual adjustment of an operating parameter of a selected one of a plurality of environmental control devices in a building comprising the steps of:

providing at least one computer formed to produce an operating parameter set point based signal and to produce an environmental control device identifying signal for communication to a selected environmental control device located in said building, each of the plurality of environmental control devices being adapted for, and responsive to, receipt of said set point based signal and a unique identifying signal to adjust an operating parameter set point therefor;

connecting said computer through a global computer network for communication of signals to said plurality of environmental control devices;

inputting said computer to produce a unique identifying signal for said selected environmental control device and to produce said set point based signal for adjustment of the operating parameter set point of said selected environmental control device; and communicating said unique identifying signal and said set point based signal to the selected environmental control device through said global computer network to effect adjustment of the operating parameter set point for said selected environmental control device independently of a remainder of said environmental control devices.

2. The process as defined in claim 1 wherein, said step of providing a computer is accomplished by providing said computer as an Internet appliance, and said step of connecting said computer is accomplished by connecting said Internet appliance to a website on said global computer network.

3. The process as defined in claim 1 wherein, said step of connecting said global computer network to at least one of said plurality of environmental control devices is accomplished by connecting a website on said global computer network to a building computer connected to said plurality of environmental control devices through a local area network; and said step of connecting said Internet appliance to a website is accomplished by connecting a wireless telephone to said website.

4. The process as defined in claim 1 wherein, said plurality of environmental control devices are located in a plurality of spaces in said building; and wherein said step of providing at lest one computer is accomplished by providing a computer in each of said spaces; and said step of communicating is accomplished by communication of said unique identifying signal and said set point based signal from a computer located in the same space as said selected environmental control device through said global computer network to said selected environmental control device.

5. The process as defined in claim 1 wherein, each of said environmental control devices is further adapted to produce space parameter signal as to current parameter in a space in which said environmental control device is located;

said providing step is accomplished by providing a plurality of computers each capable of producing a set point based signal and a unique identifying signal;

said step of connecting said computer is accomplished by connecting a selected one of said plurality of computers to a website on said global computer network adapted for communicating signals to said environmental control devices;

said step of connecting said computer is further accomplished by connecting said website to a building computer having a storage device therein formed for storage of space parameter signals correlated to individual environmental control devices, said building computer being connected to communicate signals to and from said environmental control devices; and the steps of:

communicating space parameter signals from said environmental control devices to said storage device in said building computer, and retrieving a stored space parameter signal from said storage device for an individual environmental control device using said selected one of said plurality of computers.

6. The process as defined in claim 5 wherein, said building computer is further adapted to retrieve space parameter signals from said environmental control devices as to a current parameter value in said plurality of spaces in said building and to store the retrieved space parameter signals in said storage device.

7. The process as defined in claim 6 wherein, said environmental control devices are a plurality of VAV devices located in said plurality of spaces in said building, said operating parameter set point in said space is the temperature set point for room air in said spaces into which supply air is to be discharged from said VAV devices, said space parameter signals are for a current room air temperature for said space, and prior to said communicating step, retrieving a current temperature set point for the VAV devices in a selected space from said building computer through the global computer network website, and during said communicating step, communicating a new temperature set point signal through the global computer network website and through the building computer to the VAV device.

8. The process as defined in claim 7 wherein, prior to said communicating step, retrieving a space parameter signal as to the current room air temperature for said space.

9. The process as defined in claim 7 wherein, said retrieving and communicating steps include retrieving and communicating encoded temperature set point based signals which are uniquely encoded to only effect adjustment of an individual VAV device.

10. The process as defined in claim 6 and the step of: prior to communicating a new temperature set point based signal, the step of retrieving a stored space parameter signal for the space having the selected environmental control device thereon from said storage device and outputting the retrieved space parameter signal at said computer.

11. The process as defined in claim 10 wherein, said providing step is accomplished by providing at least one of said plurality of computers as a wireless telephone.

12. An environmental parameter control system comprising:

a plurality of environmental control devices each adapted for, and responsive to, receipt of a signal to adjust an operating parameter set point for operation of the environmental control device, at least one of said environmental control devices being located in each of a plurality of spaces in a building;

at least one computer adapted for the transmission of an operating parameter set point based signal to a selected one of said environmental control devices so as to enable adjustment of the operating parameter set point thereof; and a global computer network adapted for selective connecting to said computer and to said environmental devices for the communication of operating parameter set point based signals between said computer and said selected one of said environmental control devices.

13. The environmental parameter control system as defined in claim 12 wherein, said computer is a wireless telephone.

14. The environmental parameter control system as defined in claim 12 wherein, said plurality of environmental control devices are provided by a plurality of VAV devices each having an adjustable temperature set point for the discharge of supply air into said spaces, and said operating parameter set point is said temperature set point for room air temperature in spaces into which said VAV devices discharge supply air.

15. The environmental parameter control system as defined in claim 12 wherein, said global computer network is adapted for connection to a building computer adapted to communicate encoded temperature set point based signals to and from each of said VAV devices through a local area network.

16. The environmental parameter control system as defined in claim 14 wherein, said VAV devices are formed to produce a space parameter signal as to the current room air temperature in said spaces, said global computer network includes a website adapted for connection to said building computer, said building computer includes software adapted to retrieve and store temperature set point based signals from said environmental control devices and to retrieve and store space parameter signals as to the current room air temperatures in said spaces, said software further being adapted to communicate temperature set point based signals and space parameter signals to a selected computer of said plurality of computers upon connecting of said selected computer to said building computer through said website.

17. The environmental parameter control system as defined in claim 16 wherein, said software includes graphical interface software formed to display said retrieved temperature set point based signals, to be adjustable by a user through said selected computer, and to communicate the adjusted temperature set point based signal to said VAV device from said website through said building computer.

18. The environmental parameter control system as defined in claim 16 wherein, at least one of said computers is a wireless telephone.

19. A process for individual adjustment of an operating parameter of a selected one of a plurality of environment control devices in a building comprising the step of:

communicating a unique environmental control device identifying signal and an operating parameter set point based signal to a selected environmental control device through a global computer network to effect adjustment of the operating parameter set point for said selected environmental control device independently of a remainder of said environmental control devices.

20. An environmental parameter control system comprising:

a plurality of environmental control devices each adapted for, and responsive to, receipt of a signal to adjust an operating parameter set point for operation of the environmental control device, at least one of said environmental control devices being located in each of a plurality of spaces in a building;

at least one computer adapted for wireless transmission of an operating parameter set point based signal to a selected one of said environmental control devices so as to enable adjustment of the operating parameter set point thereof; and a computer network adapted for selective wireless connection to said computer and connected to environmental devices for the communication of operating parameter set point based signals between said computer and said selected one of said environmental control devices.

* * * * *